United States Patent [19]
Konno et al.

[11] Patent Number: 5,832,184
[45] Date of Patent: *Nov. 3, 1998

[54] IMAGE PROCESSING APPARATUS AND METHOD

[75] Inventors: Yuji Konno, Kawasaki; Hisashi Ishikawa, Yokohama, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 638,590

[22] Filed: Apr. 29, 1996

[30] Foreign Application Priority Data

May 1, 1995 [JP] Japan ................................. 7-107330

[51] Int. Cl.$^6$ .................................................. G06F 15/00
[52] U.S. Cl. .......................................... 395/102; 395/117
[58] Field of Search .................................... 395/101, 102, 395/109, 112, 114, 115, 116, 117; 358/465, 466, 455, 456, 460; 382/293, 295–299

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,918,543 | 4/1990 | Petilli ..................................... 358/465 |
| 5,012,434 | 4/1991 | Zietlou et al. ........................... 395/117 |
| 5,270,808 | 12/1993 | Tanioka . |

FOREIGN PATENT DOCUMENTS

| | | |
|---|---|---|
| 0317140 | 5/1989 | European Pat. Off. . |
| 0369778 | 5/1990 | European Pat. Off. . |
| 0501023 | 9/1992 | European Pat. Off. . |
| 0550872 | 7/1993 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |
| 62-053492 | 3/1987 | Japan . |
| 63-123271 | 5/1988 | Japan . |
| 3046589 | 7/1991 | Japan . |
| WO91 06174 | 5/1991 | WIPO . |

OTHER PUBLICATIONS

H. Kotera, et al., "A Poster–Size Color Ink–Jet Printing System", *Proceedings of the Society for Information Display (SID)*, vol. 25, No. 4, pp. 321–329, 1984.

T. Watanabe, "Improved Dithering Methods for Color Quantized Images", *Systems and Computers in Japan*, vol. 21, No. 10, pp. 68–77, 1990.

*Primary Examiner*—Arthur G. Evans
*Attorney, Agent, or Firm*—Fitzpatrick, Cella, Harper & Scinto

[57] ABSTRACT

This invention has as its object to provide an image processing apparatus and method, which can re-arrange image data in correspondence with the recording unit used without increasing the capacity of a line memory used in HV conversion, even when the amount of image data to be processed increases to attain a higher resolution. In order to achieve the above object, according to this invention, the following technique is disclosed. Pixel data output from a quantization unit are converted into ID data indicating dot patterns to be converted on the basis of their density values in a representative color table, and thereafter, the arrangement order, in the horizontal direction, of a plurality of ID data is re-arranged in correspondence with the arrangement direction (vertical direction) of nozzles of a recording head.

14 Claims, 12 Drawing Sheets

IMAGE PROCESSING APPARATUS AND METHOD

BACKGROUND OF THE INVENTION

The present invention relates to an image processing apparatus and method and, for example, to an image processing apparatus and method for printing data on a recording medium using a recording head consisting of a plurality of recording elements.

Figure 11:
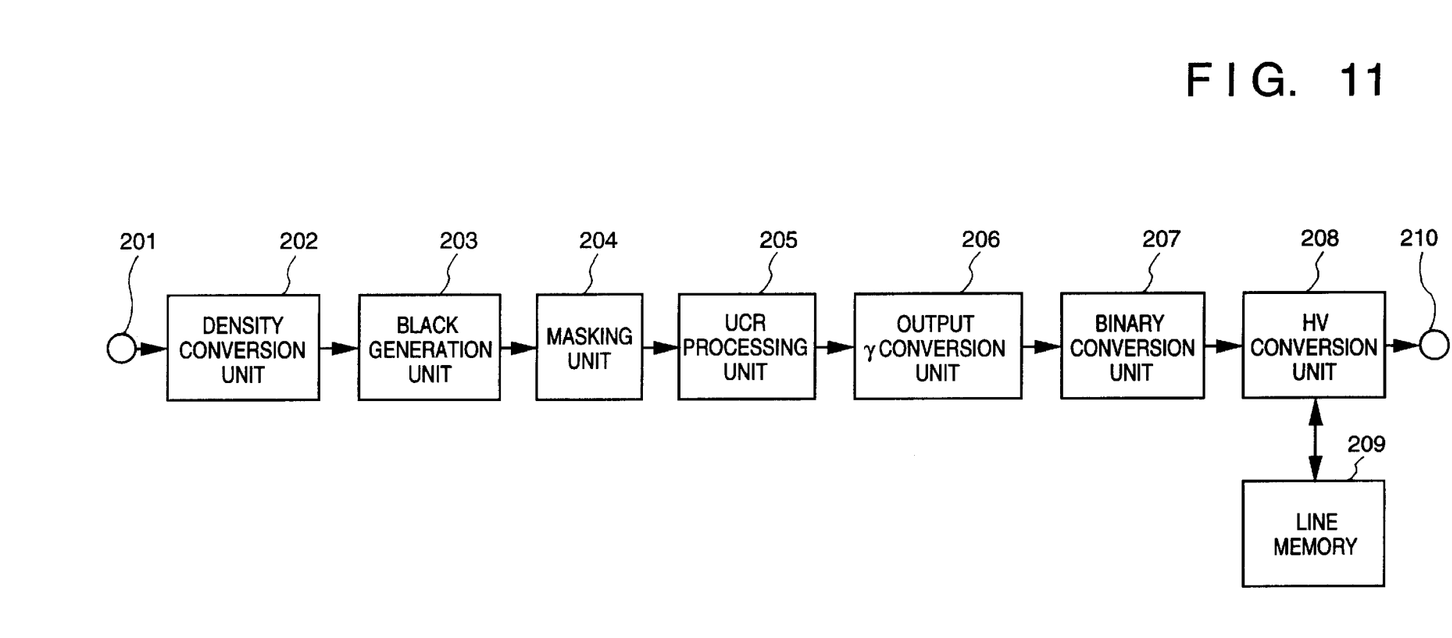
FIG. 11 is a block diagram showing the arrangement for performing image processing in a conventional ink-jet printer.

FIG. 11 shows an arrangement for performing image data processing in an ink-jet printer which attains a print operation using a recording head that ejects ink droplets. Referring to FIG. 11, reference numeral 201 denotes an image data input unit; 202, a density conversion unit; 203, a black generation unit; 204, a masking unit; 205, a UCR processing unit; 206, an output γ conversion unit; 207, a binary conversion unit; 208, an HV conversion unit; 209, a line memory; and 210, an image data output unit.

The image data input unit 201 inputs NTSC-RGB image data which consists of a total of 24 bits per pixel (each color consists of 8 bits per pixel) in the raster format, and the input image data is input to the density conversion unit 202. Since the luminance signal and the density signal have a log relationship therebetween, the density conversion unit 202 converts R, G, and B luminance data into C, M, and Y density data by log conversion. The black generation unit 203 determines the minimum one of the C, M, and Y data to be black density data K. The masking unit 204 converts the C, M, and Y data into C', M', and Y' data by a known matrix calculation. The UCR processing unit 205 removes a portion replaced by black (K) from the respective colors C', M', and Y' at predetermined ratios. Then, the output γ conversion unit 206 performs gamma conversion in consideration of the γ characteristics of ink itself.

The binary conversion unit 207 converts multi-value C, M, Y, and K data obtained by the conversion up to the output γ conversion unit 206 into binary data. As the binary conversion processing method, an error diffusion method, dither method, or the like is used. The binary data are input to the HV conversion unit 208. The HV conversion unit 208 converts the binary data, which are arranged in the raster format, in correspondence with the nozzle direction of an ink-jet head using the line memory 209. If 24 nozzles per color are aligned in the vertical direction, the HV conversion unit 208 performs HV conversion for replacing the horizontal and vertical directions with each other using the line memory 209 which has a capacity for 24 lines per color. The image data output unit 210 outputs the Y, M, C, and K binary data each color of which is expressed by 1 bit per pixel, and which are aligned in the nozzle direction of the ink-jet head.

In the conventional ink-jet printer, image data is supplied to an ink-jet head driving unit via the above-mentioned processing.

However, the conventional ink-jet printer suffers the following problem.

In recent ink-jet printers, the resolution has remarkably increased as compared to conventional printers. Along with such increase in resolution, the image quality of the output image can be improved, but the amount of image data to be processed increases considerably. Any increase in data amount means a considerable increase in capacity of the line memory 209 used in HV conversion in the ink-jet printer. Therefore, the resulting increase in memory cost inevitably leads to an increase in cost of the entire printer.

SUMMARY OF THE INVENTION

The present invention has been made to solve the above-mentioned problem, and has as its object to provide an image processing apparatus and method, which can re-arrange image data in correspondence with a recording unit without increasing the capacity of a line memory used in HV conversion, even when the amount of image data to be processed increases to attain a higher resolution.

As one means for attaining the above-mentioned object, an image processing apparatus according to one invention of the present application comprises the following arrangement.

That is, an image processing apparatus for re-arranging dots of image data constituted by dot patterns, and outputting the re-arranged image data, comprises ID conversion means for converting the dot patterns into corresponding ID data, and first HV conversion means for replacing with each other horizontal and vertical directions of an arrangement order of a plurality of ID data obtained by converting a plurality of dot patterns by the ID conversion means.

According to another embodiment, the invention of the present application comprises the following arrangement.

That is, an image processing apparatus for an image forming apparatus which forms dots for a plurality of lines in a single scan of an image forming unit, comprises input means for sequentially inputting multi-value image data in a scanning direction of the image forming unit, and conversion means for re-arranging the multi-value image data in a direction perpendicular to the scanning direction, and generation means for generating a dot pattern consisting of a plurality of dots for each pixel of the multi-value image data re-arranged by said conversion means.

It is another object of the present invention to effectively use the functions of a host computer.

Other objects and features of the present invention will become apparent from the following description taken in conjunction with the accompanying drawings and the appended claims.

DESCRIPTION OF THE PREFERRED EMBODIMENTS

The preferred embodiments of the present invention will be described in detail hereinafter with reference to the accompanying drawings.

<First Embodiment>

Figure 1:
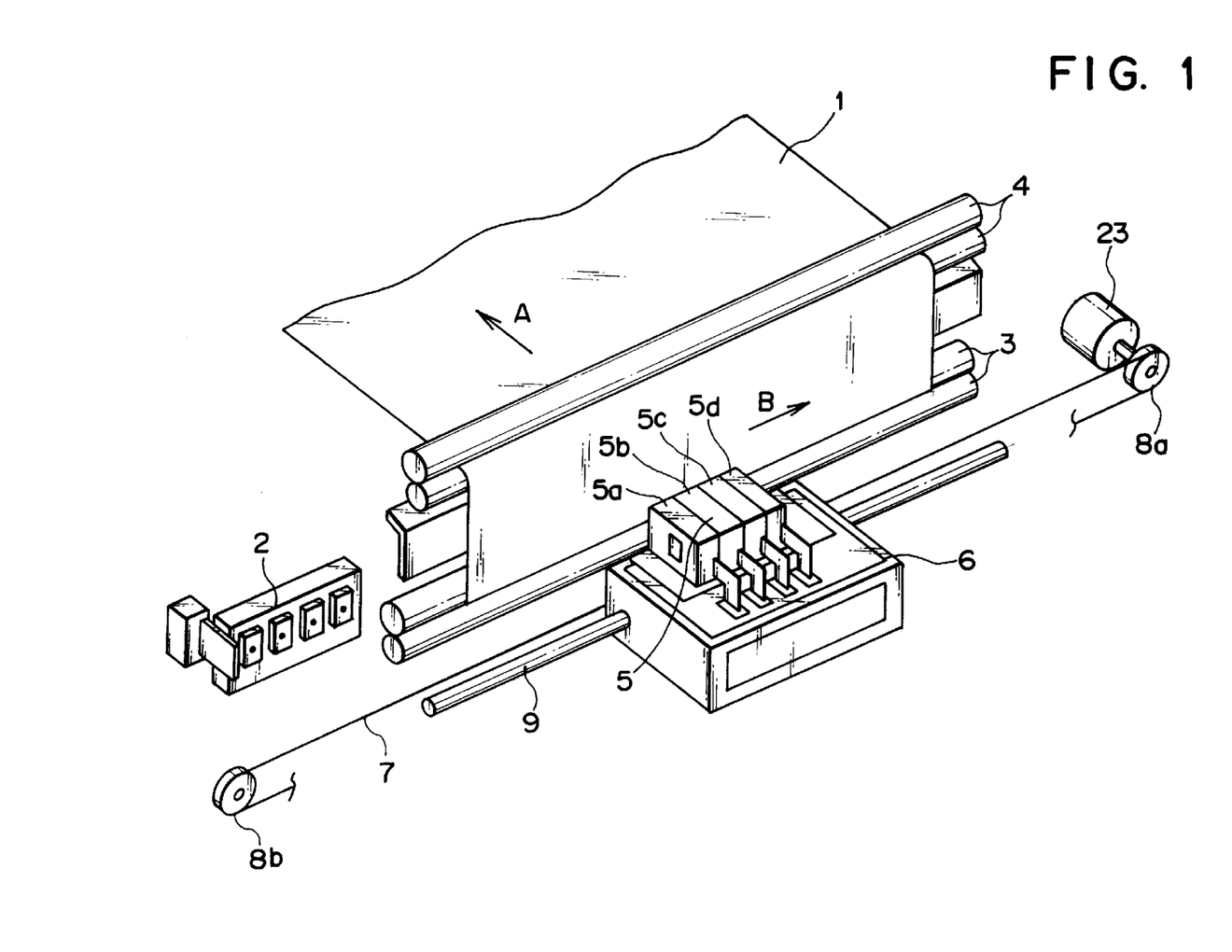
FIG. 1 is a perspective view showing an ink-jet type color printer according to the first embodiment of the present invention.

FIG. 1 is a perspective view showing an ink-jet type color printer in the first embodiment. The arrangement of the overall color printer will be explained below. Referring to FIG. 1, reference numeral 1 denotes a recording medium consisting of a paper or plastic sheet. A plurality of sheets 1 stacked on, e.g., a cassette, are fed one by one by a pickup roller (not shown), and each sheet is conveyed in the direction of an arrow A by a pair of first convey rollers 4 which are arranged to be separated by a predetermined interval and are driven by corresponding stepping motors (not shown).

Figure 2:
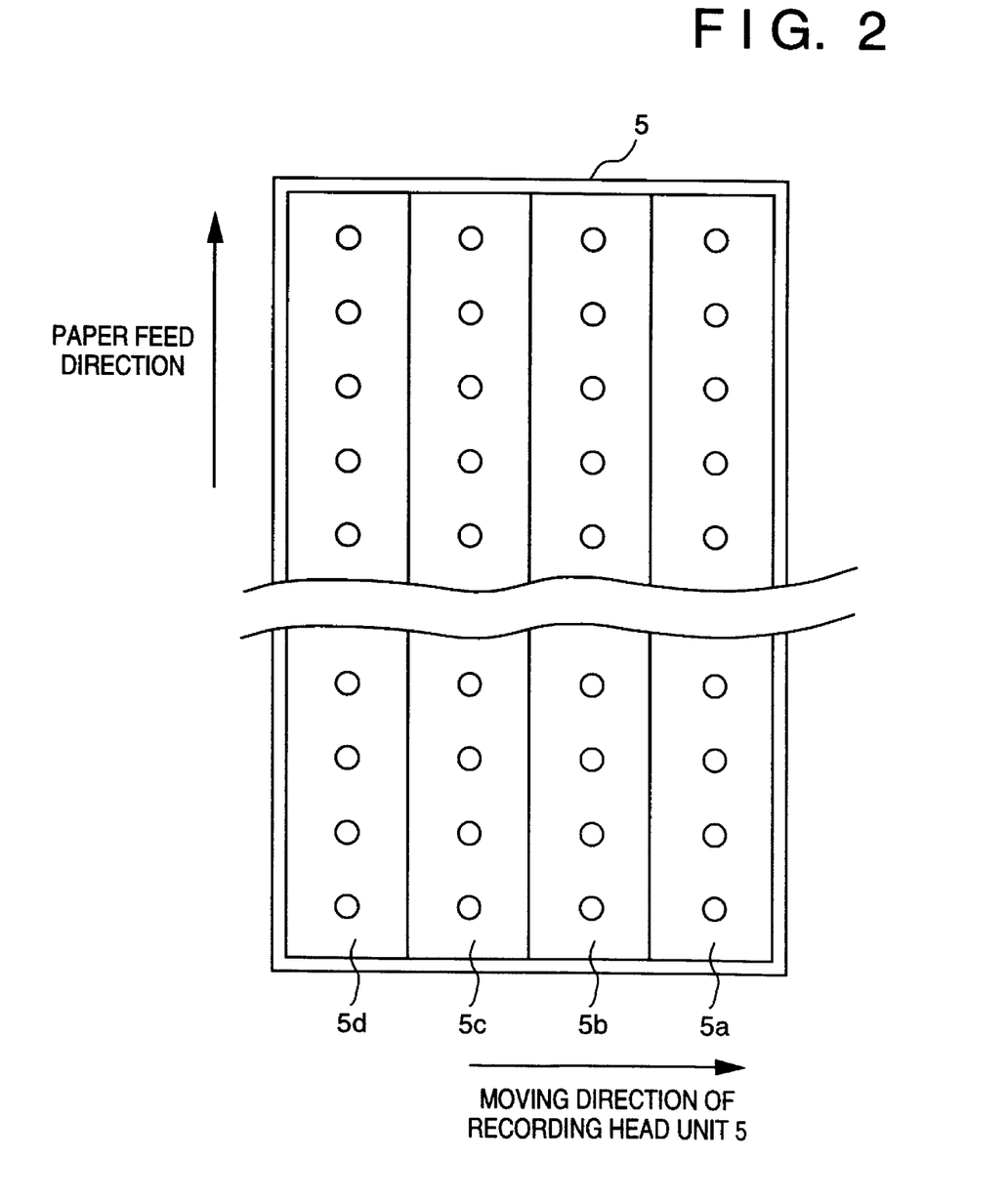
FIG. 2 is a front view of a recording head of the color printer of the first embodiment.

Reference numeral 5 denotes an ink-jet type recording head unit for performing recording on the sheet 1. The head unit 5 comprises heads 5a, 5b, 5c, and 5d for respectively ejecting Y (yellow), M (magenta), C (cyan), and Bk (black) inks. FIG. 2 is a front view of the recording head unit 5. Each of the heads 5a to 5d has a plurality of nozzles. The color inks are stored in ink cartridges (not shown), and are ejected from the nozzles of the heads 5a to 5d in correspondence with an image signal, thus attaining a print operation on the recording sheet 1.

The recording head unit 5 and the ink cartridges are mounted on a carriage 6, which is coupled to a carriage motor 23 via a belt 7 and pulleys 8a and 8b. That is, the carriage 6 reciprocally scans along a guide shaft 9 upon driving the carriage motor 23.

With the above arrangement, the recording head unit 5 ejects inks onto the recording sheet 1 in correspondence with an image signal to record an ink image thereon while moving in the direction of an arrow B. The recording head unit 5 returns to its home position as needed and an ink recovery device 2 removes inks clogged in the nozzles at that position. In addition, a pair of convey rollers 3 and the pair of convey rollers 4 are driven to feed the recording sheet 1 by one line in the direction of the arrow A. By repeating the above-mentioned operation, a predetermined recording operation is performed on the recording medium 1.

A control system for driving the respective members of the color printer will be explained below.

Figure 3:
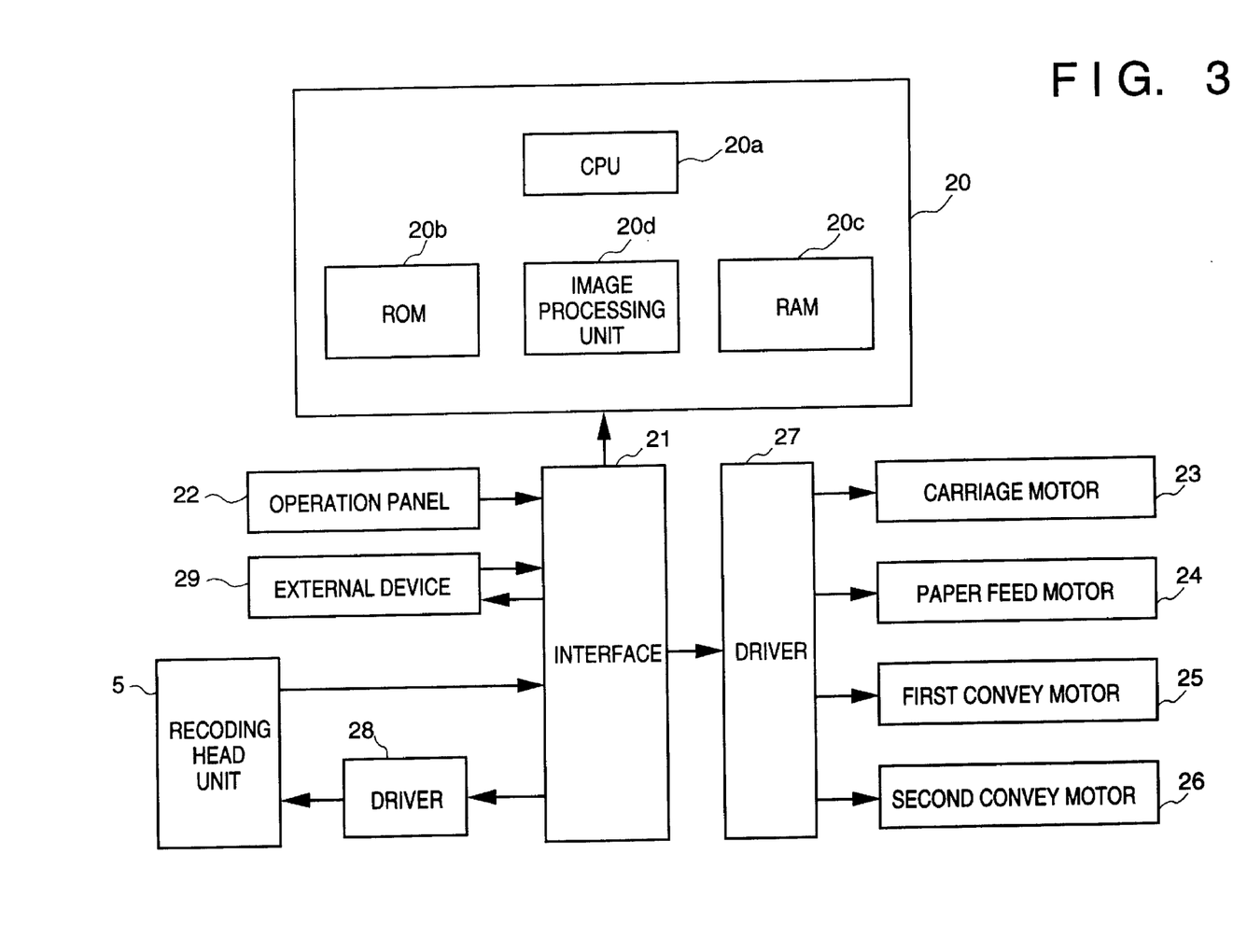
FIG. 3 is a block diagram showing a control system for driving the respective members of the color printer of the first embodiment.

The control system in the color printer of this embodiment comprises a control unit 20 which comprises a CPU 20a comprising, e.g., a microprocessor, a ROM 20b which stores control programs for the CPU 20a and various data, a RAM 20c which is used as a work area of the CPU 20a and temporarily stores various data, and an image processing unit 20d (to be described later), an interface 21, an operation panel 22, a driver 27 for driving various motors (the motor 23 for driving the carriage, a motor 24 for driving a sheet feed motor, a motor 25 for driving the first convey rollers, and a motor 26 for driving the second convey rollers), and a driver 28 for driving the recording head unit 5.

In the above arrangement, the control unit 20 receives various kinds of information (e.g., character pitch information, character type information, and the like) from the operation panel 22 and an image signal from an external device 29 via the interface 21. The control unit 20 outputs ON/OFF signals for driving the motors 23 to 26 and an image signal via the interface 21, thereby driving the respective members.

Figure 4:
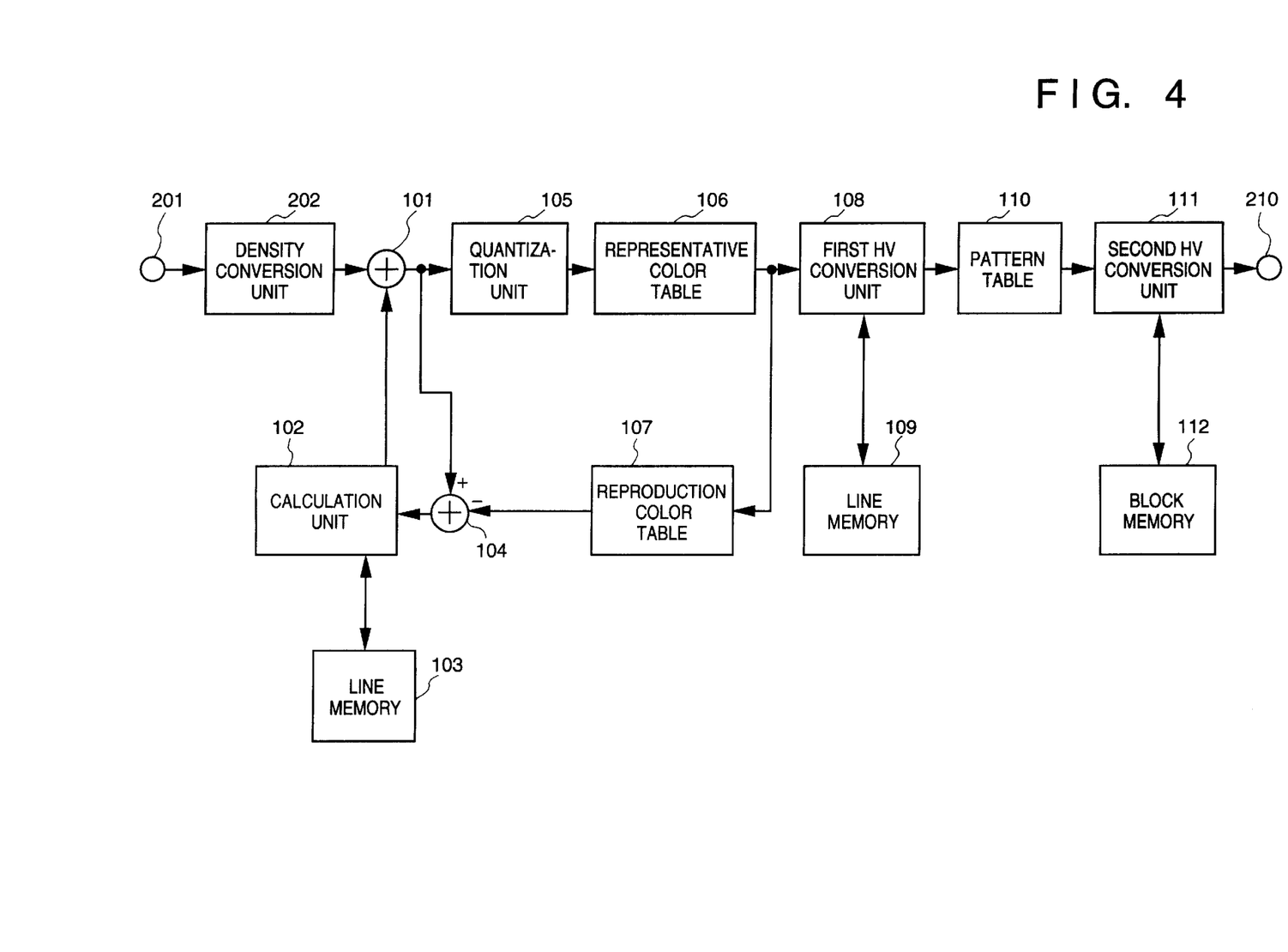
FIG. 4 is a block diagram showing in detail the arrangement of an image processing unit of the first embodiment.

FIG. 4 shows the arrangement of the above-mentioned image processing unit 20d. The same reference numerals in FIG. 4 denote the same parts as in the prior art shown in FIG. 11, and a detailed description thereof will be omitted.

Referring to FIG. 4, reference numeral 101 denotes an adder; 102, a calculation unit; 103 and 109, line memories; 104, a subtracter, 105, a quantization unit; 106, a representative color table; 107, a reproduction color table; 108 and 111, HV conversion units; 110, a pattern table; and 112, a block memory. The operations of these units will be described below.

R, G, and B luminance data input from an image data input unit 201 via the interface 21 are converted into C, M, and Y density data ($C_i$, $M_i$, and $Y_i$; i indicates the pixel position) by a density conversion unit 202. These density data are input to the adder 101 and are added to errors ($EC_i$, $EM_i$, and $EY_i$) diffused from pixels quantized by quantization unit 105 (in this embodiment, binary-converted pixels). Let $SC_i$, $SM_i$, and $SY_i$ be the sum data. The data $SC_i$, $SM_i$, and $SY_i$ output from the adder 101 are input to and quantized by the quantization unit 105, and the quantized data are output as data $SC_i'$, $SM_i'$, and $SY_i'$.

The representative color table 106 stores dot patterns each for several dots and identification (ID) data of these dot patterns in correspondence with a values of input $SC_i'$, $SM_i'$, and $SY_i'$ in the form of a table. The table 106 identifies a dot pattern corresponding to data $SC_i'$, $SM_i'$, and $SY_i'$ of an input pixel of interest, and outputs its ID data. Note that the ID data is a code indicating the correspondence between the input density data and the dot pattern to be printed. The dot pattern to be identified by the representative color table 106 will be explained below.

Figure 5:
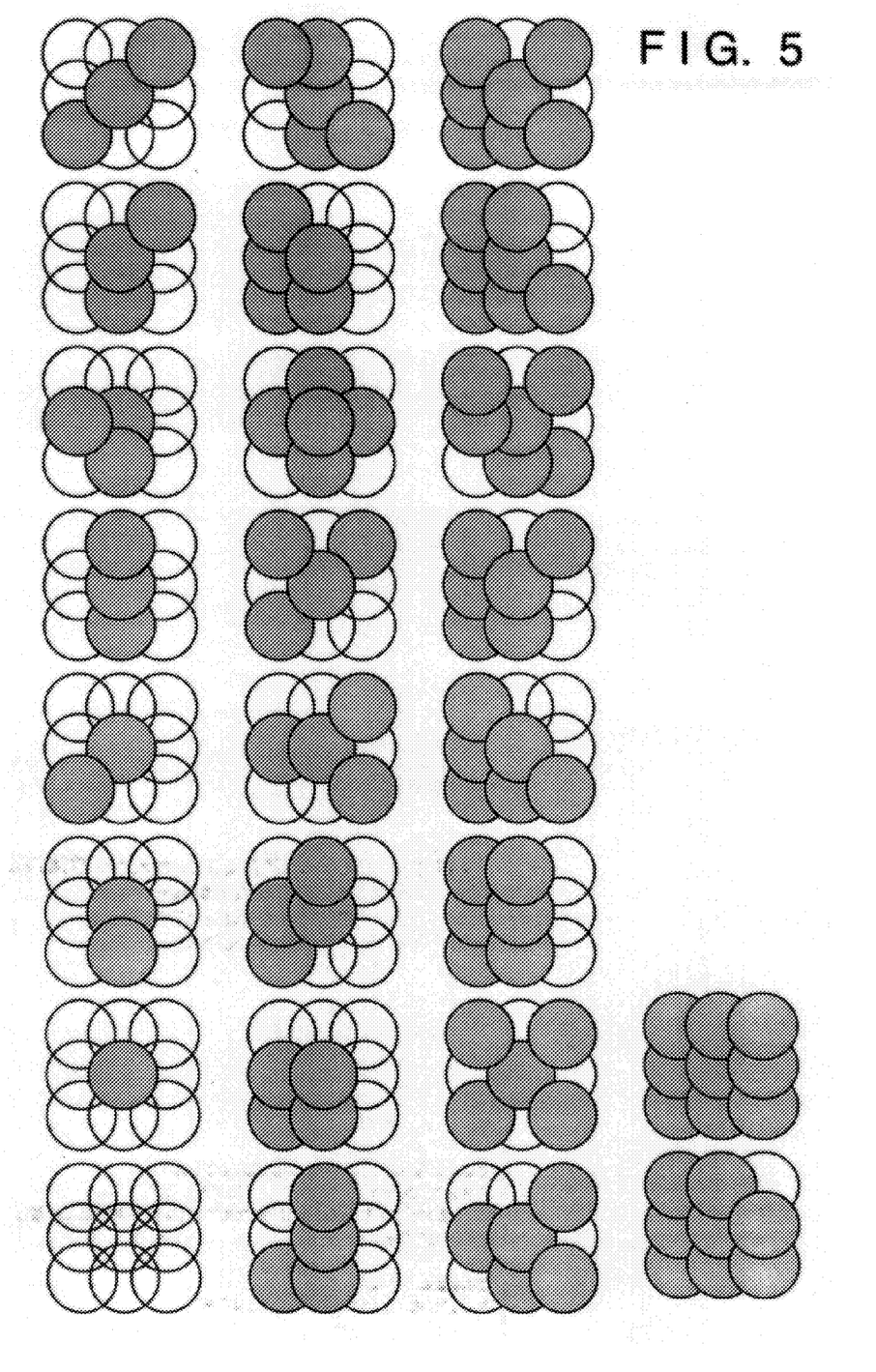
FIG. 5 is a view showing dot patterns corresponding to all gradation levels converted by a representative color table in the first embodiment.

FIG. 5 shows an example of the dot patterns to be identified by the representative color table 106. Gradation levels can be expressed by the number of dots in each dot pattern, as shown in FIG. 5. Furthermore, in consideration of the overlapping states of dots, a larger number of gradation levels can be expressed. FIG. 5 exemplifies a case wherein the dot pattern to be identified is, e.g., a 3×3 dot matrix. In this case, since the 3×3 matrix is used, 512 ($=2^9$; the 9th power of 2, $A^B$ represents the B-th power of A) combinations of patterns are available. However, since these combinations include those representing identification gradation levels when they are rotated or shifted, 26 combinations, i.e., 26 gradation patterns are available in practice, as shown in FIG. 5.

The case of a single color has been described. In consideration of color mixing, 456,976 ($=26^4$) colors can be expressed by combining dot patterns of four color components, Y, M, C, and K. However, in practice, due to limitations on color mixing (e.g., only two color dots can be superposed on one dot) or by the presence of combinations that reproduce substantially the same colors upon output, the number of colors can be reduced. For example, a satisfactory output image can be obtained using about 4,096 expression colors. If these 4,096 colors are considered as representative colors, ID data for identifying these colors can be expressed by 12 bits. Therefore, when the 4,096 colors are used as representative colors, and each color is expressed by 12-bit ID data, the data amount can be greatly reduced as compared to a case wherein all the combinations of colors are expressed by the ON/OFF states of dots in the respective dot patterns.

In the representative color table 106, a table that stores the above-mentioned 4,096 representative colors in correspondence with ID data for identifying these representative colors is prepared in advance and held. The table 106 identifies a representative color on the basis of a total of 12-bit input data, i.e., data SCi', SMi', and SYi' quantized by the quantization unit 105, and outputs corresponding 12-bit ID data.

Since a dot pattern consisting of several dots is output for one input pixel, resolution conversion can be attained simultaneously. For example, when a 3×3 dot pattern shown in FIG. 5 is identified and assigned to one input pixel, the input image size can be reduced to ⅑ even when an image having the same size (the same number of pixels) is to be output. Therefore, this leads to a decrease in data amount to be processed upon execution of HV conversion (to be described later). Note that dot patterns prepared in this embodiment are not always limited to 3 dots×3 dots per pixel.

The reproduction color table 107 will be described below. In the reproduction color table 107, a table that stores the ID data, which are output from the representative color table 106 and identify the representative colors, in correspondence with the density values (CPi, MPi, and YPi) of the respective colors upon actually outputting the representative color indicated by the ID data, is prepared in advance and held. These output density values may be empirically obtained by, e.g., measuring the actually output representative colors and converting the obtained data into density values. The reproduction color table 107 receives ID data which is output from the representative color table 106 and identifies the representative color, and outputs corresponding color density values (CPi, MPi, and YPi).

The subtracter 104 subtracts the density values CPi, MPi, and YPi output from the reproduction color table 107 from the density values SCi, SMi, and SYi output from the adder 101, and outputs difference data. The difference data correspond to errors (ECi, EMi, and EYi) between the output representative color and reproduction color with respect to the input density values.

The calculation unit 102 weights the errors (ECi, EMi, and EYi) between the output representative color and reproduction color with respect to the input density values, and distributes the weighted errors to surrounding pixels via the adder 101. With this operation, since errors generated when input image data is mapped on limited representative colors can be compensated for, density reproducibility can be improved, and generation of pseudo contouring can be suppressed. Note that the line memory 103 is used as a work area upon, e.g., weighting in the calculation unit 102.

Subsequently, the first HV conversion unit 108 will be explained below. The first HV conversion unit 108 re-arranges ID data output from the representative color table 106 in the arrangement direction of the nozzles in the recording head unit 5 using the line memory 109. Note that the driving direction of the recording head unit 5 is defined as a main scanning direction (H direction), and the arrangement direction of the nozzles is defined as a sub-scanning direction (V direction). For example, when the number of nozzles constituting the sub-scanning direction of the recording head unit 5 is 24, and a dot pattern that expresses a representative color consists of 3 dots×3 dots, ID data for eight main scanning lines need only be stored in the line memory 109. The ID data arranged in the main scanning direction (H direction) on the line memory 109 are re-arranged in the sub-scanning direction (V direction).

Figure 6A:
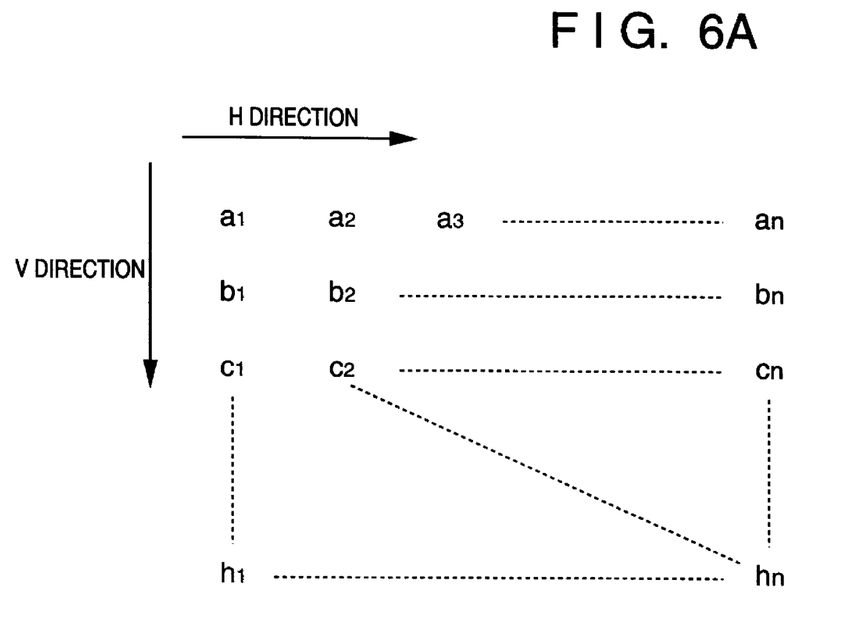
FIGS. 6A and 6B are views for explaining conversion into ID data indicating a representative color in the first embodiment.
Figure 6B:
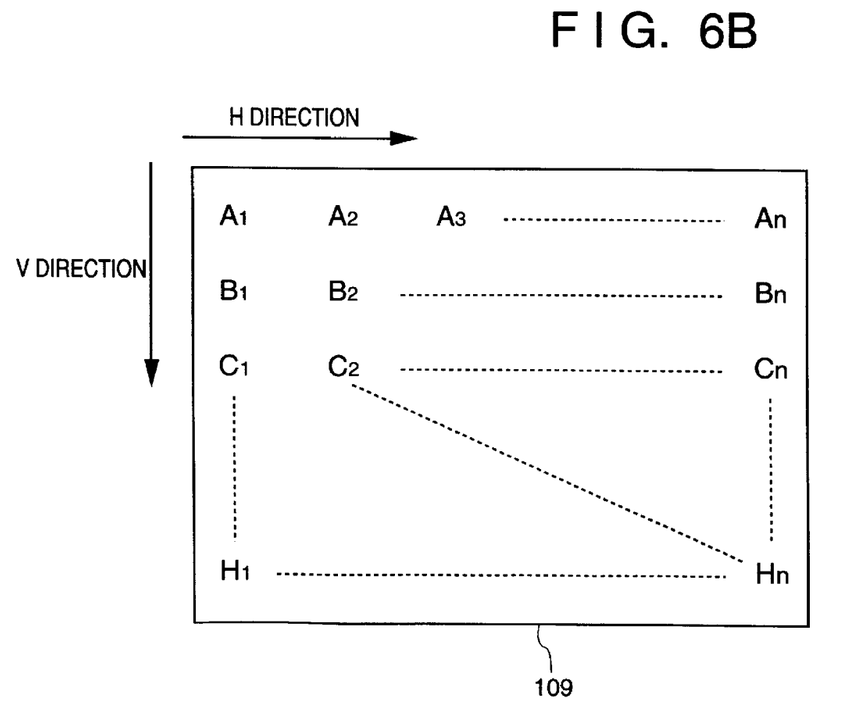

The HV conversion will be described in detail below with reference to FIGS. 6A to 7C. FIG. 6A shows an input pixel group, and FIG. 6B shows a state wherein the ID data of representative colors replace the respective pixels on the basis of the representative color table 106. More specifically, the ID data of the representative color of a pixel a1 shown in FIG. 6A corresponds to A1 shown in FIG. 6B. Note that both FIGS. 6A and 6B exemplify data for eight main scanning lines (rows a to h) of input pixels. That is, FIG. 6B shows the ID data for eight lines stored in the line memory 109.

Figure 7A:
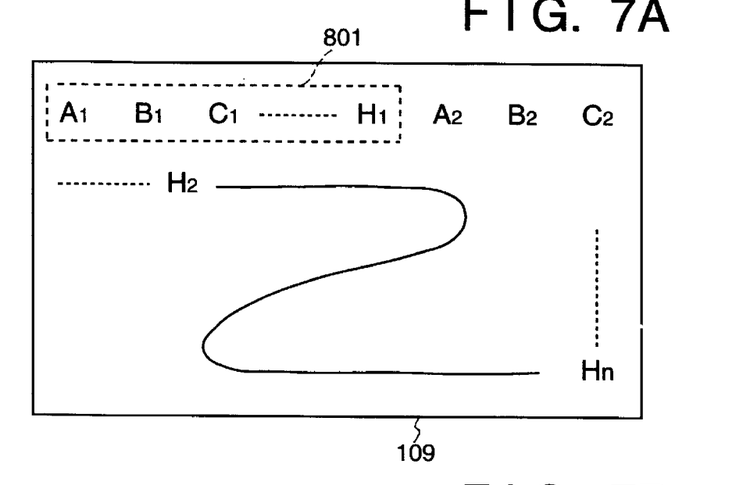
FIGS. 7A to 7C are views for explaining HV conversion based on ID data in the first embodiment.

The first HV conversion unit 108 converts the ID data arranged as shown in FIG. 6B into those arranged as shown in FIG. 7A on the line memory 109. The ID data for eight lines A1 to H1 which are arranged in the vertical direction in FIG. 6B are re-arranged in the horizontal direction, as shown in FIG. 7A.

Figure 8:
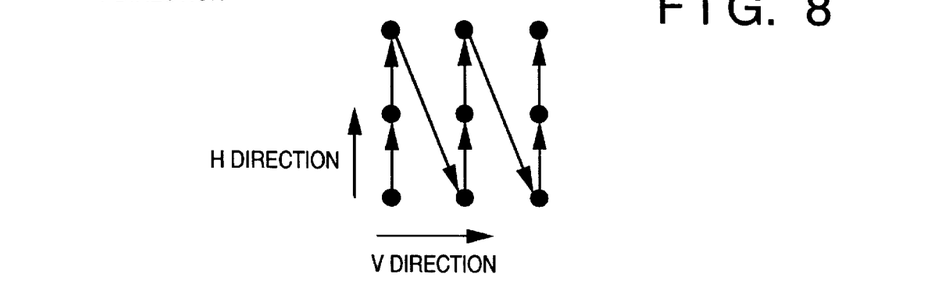
FIG. 8 is a view for explaining the data order or sequence in a dot pattern in the first embodiment.

The ID data re-arranged by the first HV conversion unit 108 are input to the pattern table 110. The pattern table 110 outputs dot patterns to be output from the recording head unit 5 in correspondence with the input ID data, i.e., the dot patterns shown in FIG. 5 above. For example, the ON/OFF states of dots in the pattern of 3 dots×3 dots (9 dots) for each of Y, M, C, and K colors is expressed by 1 bit per color in the order shown in FIG. 8 in correspondence with the input 12-bit ID data. More specifically, the table 110 outputs 4 bits per dot in the pattern. Note that the dot patterns shown in FIG. 5 are pre-stored in, e.g., the ROM 20b in the control unit 20.

Figure 7B:
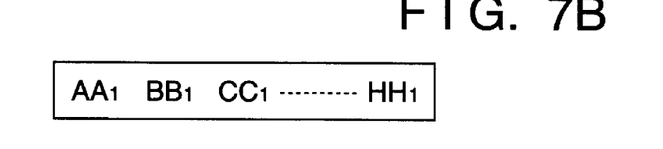
Figure 7C:
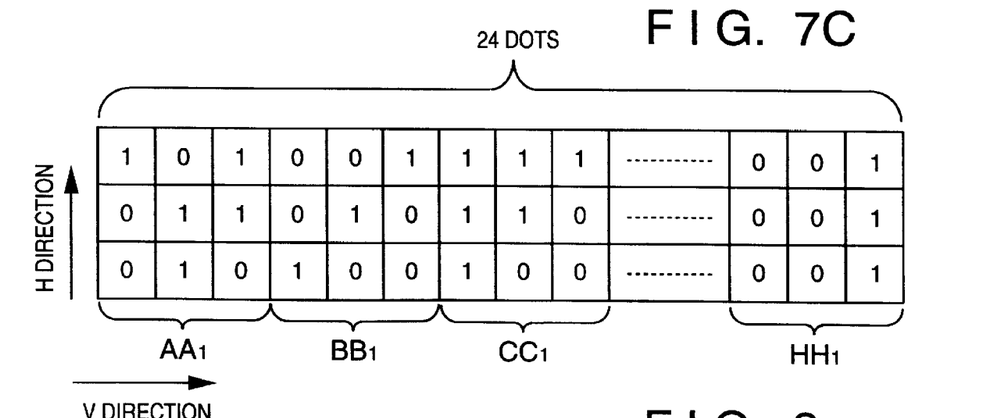

The second HV conversion unit 111 performs HV conversion in units of blocks since the dot pattern is converted by the pattern table 110 in units of blocks. That is, the conversion result of data A1 to H1 denoted by reference numeral 801 in FIG. 7A into a dot pattern in the pattern table 110 is as shown in FIG. 7B, and is stored as one block line in the block memory 112. The storage state of the block memory 112 is as shown in, e.g., FIG. 7C. The second HV conversion unit 111 performs HV conversion of the respective blocks stored in the block memory 112 in the arrangement direction of the nozzles of the recording head unit 5, and outputs the converted data to the image data output unit 210.

With this processing, the recording head unit 5 can obtain an input corresponding to the arrangement direction of its nozzles, and performs a print operation by ejecting inks onto the recording sheet 1.

As described above, according to this embodiment, since a representative color is identified in correspondence with each pixel block, and HV conversion of ID data indicating representative colors is performed, the capacity of the line memory required for HV conversion can be greatly reduced.

<Second Embodiment>

The second embodiment of the present invention will be described below.

Since the arrangement of an ink-jet printer according to the second embodiment is the same as that of the first embodiment described above, a detailed description thereof will be omitted.

Figure 9:
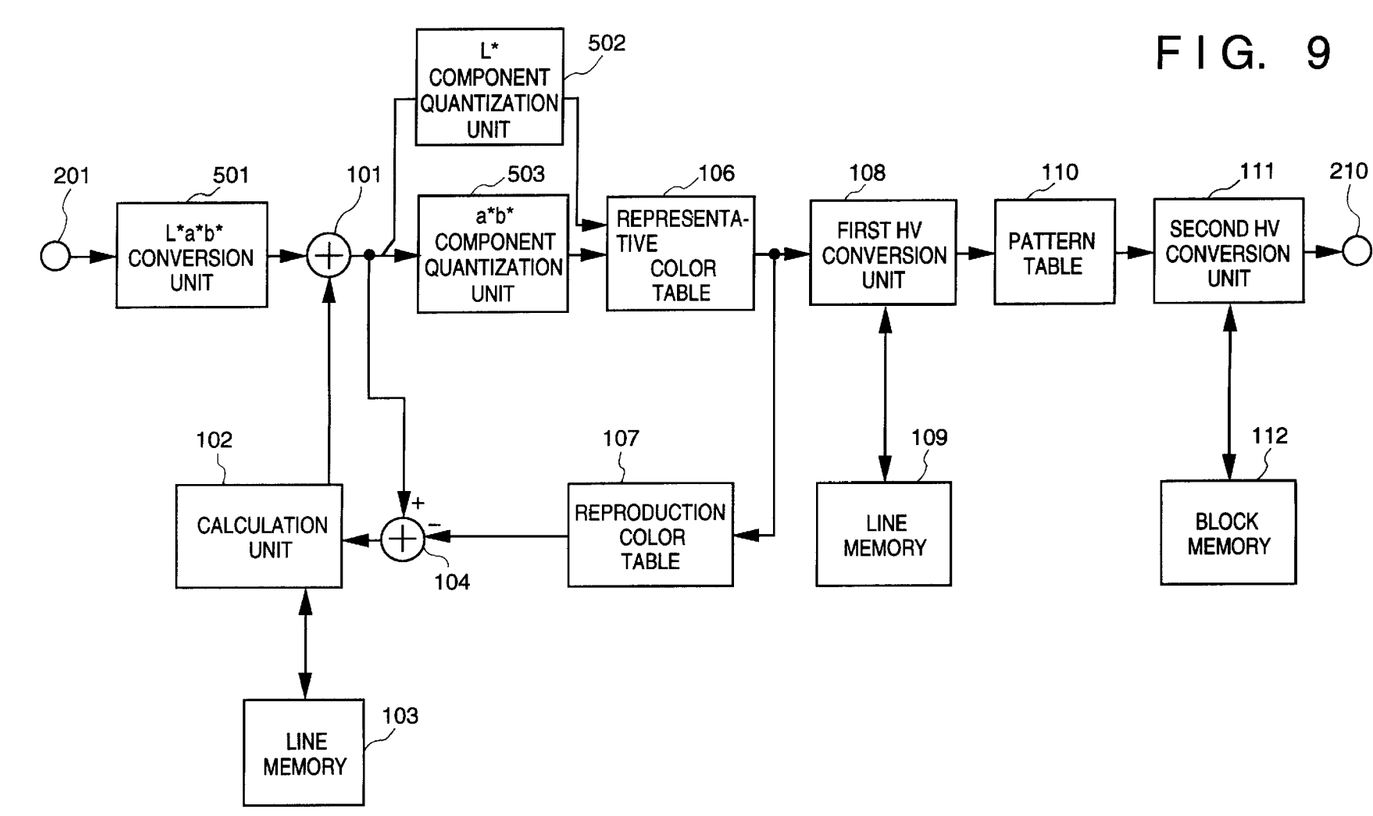
FIG. 9 is a block diagram showing in detail the arrangement of an image processing unit according to the second embodiment of the present invention.

FIG. 9 shows in detail the arrangement of the image processing unit 20d in the second embodiment. The same reference numerals in FIG. 9 denote the same parts as in FIG. 4 of the first embodiment, and a detailed description thereof will be omitted.

The second embodiment is characterized in that image data input to the representative color table 106 is data on the L*a*b* color space, and the L* component and a* and b* components are subjected to different quantization processes.

Referring to FIG. 9, reference numeral 501 denotes an L*a*b* conversion unit, which converts R, G, and B luminance signals input from the image data input unit 201 into L*, a*, and b* signals. This conversion may be realized by a table prepared in advance or by calculations in a calculation circuit although it is nonlinear conversion.

The image data converted into the L*, a*, and b* signals are added to error components by the adder 101 to obtain SL*i, Sa*i, and Sb*i signals. Of these signals, the L* signal component representing lightness and the a* and b* signal components representing hues are respectively input to an L* component quantization unit 502 and an a*b* component quantization unit 503. The quantization units 502 and 503 weight these components, and perform quantization at different precision levels. For example, the L* component quantization unit 502 performs quantization at 5-bit precision level, and the a*b* component quantization unit 503 performs quantization at 3-bit quantization level. The quantized data become input signals to the representative color table 106, and are subjected to HV conversion and the like as in the first embodiment.

As described above, according to the second embodiment, since the lightness component and the hue components of image data are subjected to quantization processes at different precision levels, mapping of representative colors suitable for the visual sense characteristics of man can be realized.

<Third Embodiment>

The third embodiment of the present invention will be described below.

Since the arrangement of an ink-jet printer according to the third embodiment is the same as that of the first embodiment described above, a detailed description thereof will be omitted.

Figure 10:
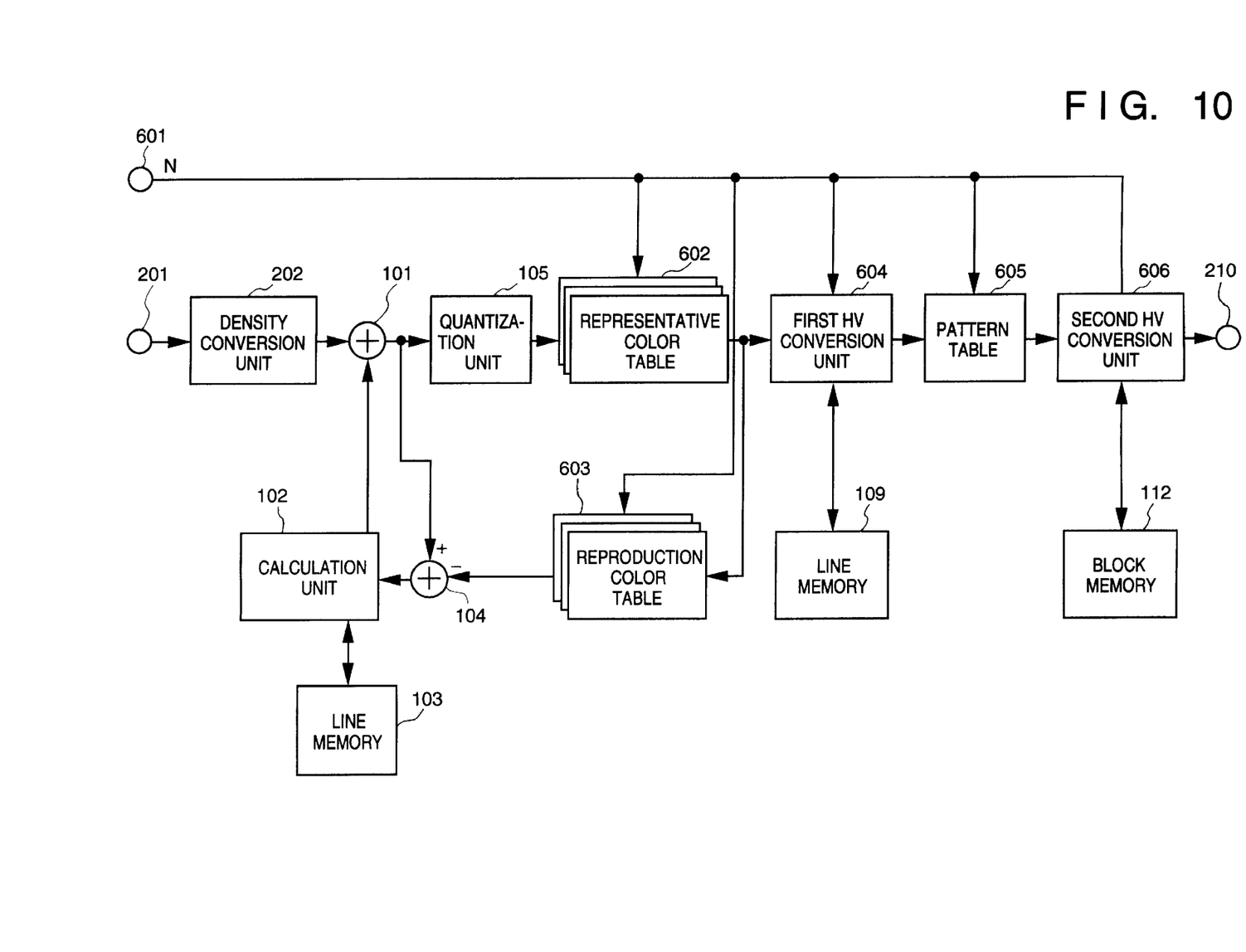
FIG. 10 is a block diagram showing in detail the arrangement of an image processing unit according to the third embodiment of the present invention.

FIG. 10 shows in detail the arrangement of the image processing unit 20d in the third embodiment. The same reference numerals in FIG. 10 denote the same parts as in FIG. 4 of the first embodiment described above, and a detailed description thereof will be omitted.

The third embodiment is characterized in that a magnification factor is input for performing variable-magnification processing of image data, and one of a plurality of pattern tables in which dot patterns are constituted by different numbers of dots is selected in correspondence with the input magnification factor.

Referring to FIG. 10, reference numeral 601 denotes a magnification factor input unit. A magnification factor N is input from the operation panel 22 via the unit 601 as information indicating the degree of enlargement/reduction of the size of an image input from the image data input unit 201. For example, assume an image input from the image data input unit 201 has a size of n×m. When this image is to be enlarged to ×4, i.e., an image having a size of 4n×4m is to be output, N=4 is input from the magnification factor input unit 601. Note that the magnification factor N may be input from the external device 29 such as a host computer in addition to the operation panel 22.

A representative color table 602 in the third embodiment comprises tables, which store ID data indicating representative color patterns, in correspondence with the number of values that the magnification factor N can assume. For example, when the magnification factor N can assume three values, 2, 3, and 4, the table 602 comprises three different tables for identifying three different dot patterns, i.e., 2×2, 3×3, and 4×4 patterns. A representative color table to be used is selected on the basis of the magnification factor N.

A reproduction color table 603 similarly comprises tables which store a plurality of representative colors in correspondence with a plurality of ID data output from the representative color table 602. A reproduction color table to be used is also selected on the basis of the magnification factor N.

Furthermore, a pattern table 605 similarly comprises tables which store a plurality of dot patterns in correspondence with the plurality of ID data. A pattern table to be used is also selected on the basis of the magnification factor N.

A first HV conversion unit 604 re-arranges ID data output from the representative color table 602 in the arrangement direction of the nozzles of the head. In this case, in the third embodiment, the conversion method of the unit 604 changes in correspondence with the magnification factor N.

For example, a case will be examined below wherein the number of nozzles in each head of the recording head unit 5 is 24. When the magnification factor is ×2, ID data for 12 lines are stored in the line memory 109, and the HV conversion described in the first embodiment is performed for 12 ID data as one unit. Similarly, when the magnification factor is ×3, ID data for eight lines are stored in the line memory 109, and the HV conversion is performed for eight ID data as one unit. In this case, the HV conversion processing is the same as that in the first embodiment described above.

As described above, when the number of nozzles of each head of the recording head unit 5 is M with respect to a minimum magnification factor Nmin of available magnification factors N, the line memory 109 need only have a capacity for at least M/Nmin lines.

A second HV conversion unit 606 stores dot patterns subjected to the variable magnification processing in the block memory 112, and performs HV conversion in units of blocks in the arrangement direction of the nozzles of the recording head unit 5. Therefore, with respect to a maximum magnification factor Nmax of available magnification factors N, the block memory 112 need only have a capacity for at least Nmax lines.

As described above, according to the third embodiment, dot patterns of a plurality of sizes are prepared, and are selectively used in correspondence with a designated magnification factor, thus allowing variable magnification processing based on a plurality of magnification factors.

In the third embodiment, a case wherein the magnification factor N is equal to or larger than "1", i.e., enlargement processing has been exemplified. For example, when pattern matching between input image data and a block consisting of a plurality of pixels is performed upon conversion to ID data indicating representative colors in the representative color table 602, reduction processing can be realized in combination with conversion to a dot pattern of a predetermined size in the pattern table 605. That is, this embodiment can also be applied to a case wherein the magnification factor is smaller than "1".

In the first to third embodiments described above, each pixel of input image data is converted into a dot pattern. However, the present invention is not limited to these embodiments, but may be applied to any other arrangements as long as image data consisting of a plurality of dots is output after the dots are re-arranged. That is, one dot need not always be converted into a dot pattern by the error diffusion method.

The present invention has exemplified a printer, which comprises means (e.g., an electrothermal transducer, laser beam, and the like) for generating heat energy as energy utilized upon execution of ink discharge, and causes a change in state of an ink by the heat energy, among the ink-jet printing methods. According to this method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge openings, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a single printing head obtained by forming printing heads integrally can be used.

In addition, not only an exchangeable chip type printing head which can be electrically connected to the apparatus main unit and can receive an ink from the apparatus main unit upon being mounted on the apparatus main unit, but also a cartridge type printing head in which an ink tank is integrally arranged on the printing head itself can be used.

It is preferable to add recovery means for the printing head, preliminary auxiliary means, and the like provided as an arrangement of the printer of the present invention since the effect of the present invention can be further stabilized. Examples of such means include, for the printing head, capping means, cleaning means, pressurization or suction means, and preliminary heating means using electrothermal transducers, another heating element, or a combination thereof. It is also effective for stable printing to execute a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printing head or by combining a plurality of printing heads.

Moreover, in each of the above-mentioned embodiments of the present invention, an ink is described as a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, the present invention can be applied to a case wherein an ink which liquefies upon application of heat energy, such as an ink which liquefies upon application of heat energy according to a printing signal and is discharged in a liquid state, an ink which begins to solidify when it reaches a printing medium, or the like, is used. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

The recording apparatus according to the present invention may be integrally or separately arranged as an image output terminal of an information processing equipment such as a computer, may be combined with a reader or the like to constitute a copying machine, or may be applied to a facsimile apparatus having a transmission/reception function.

The present invention is not limited to an ink-jet printer, but may be applied to a thermal printer which comprises a plurality of heat generating elements in a recording head. Further, the number of lines to be formed per scan, the size of a dot pattern, and the like may be appropriately changed.

The present invention may be applied to either a system constituted by a plurality of devices or an apparatus consisting of a single device.

Figure 12:
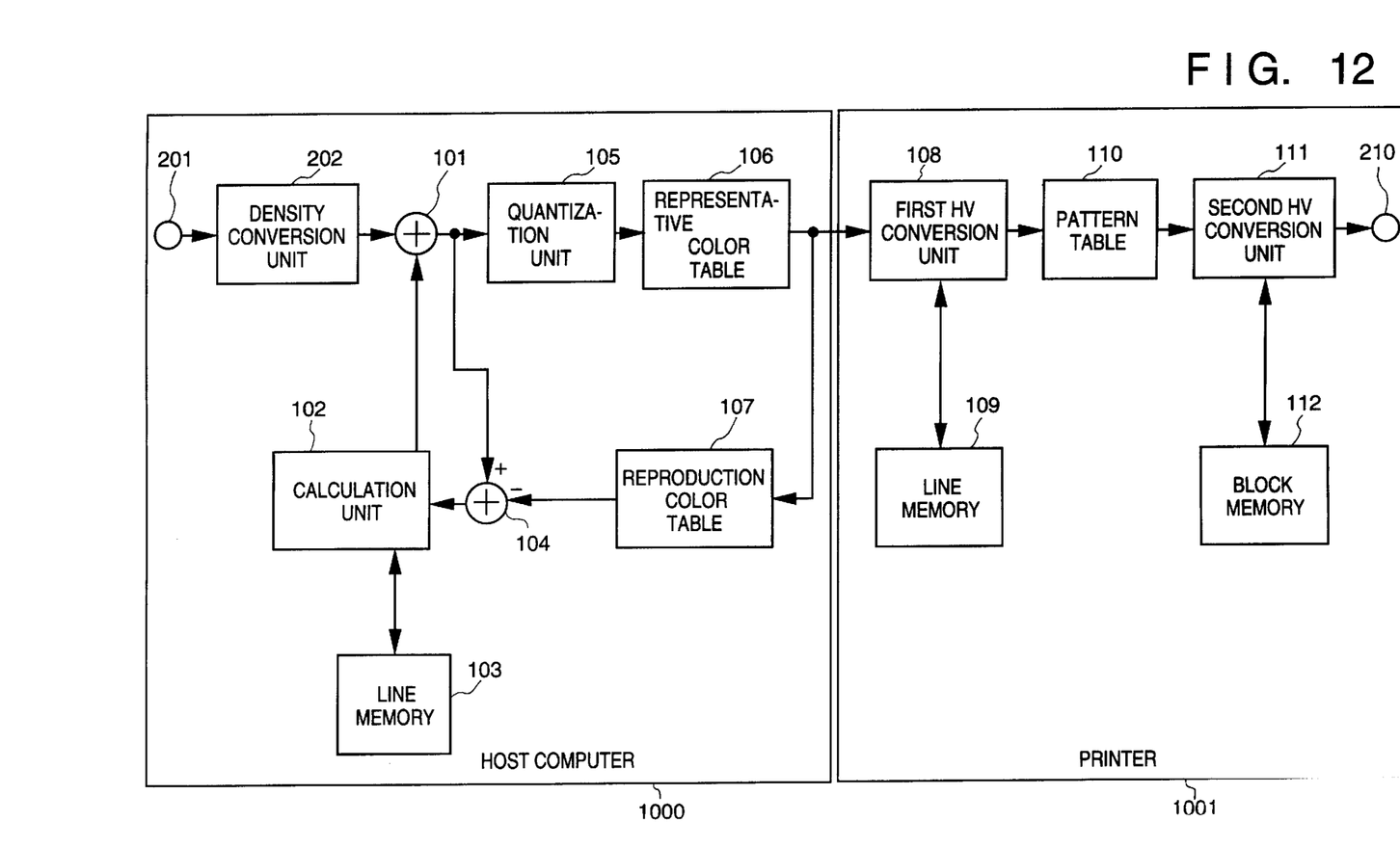
FIG. 12 is a block diagram showing a modification of the present invention.

More specifically, as shown in FIG. 12, density conversion processing, quantization processing, and representative color extraction processing are performed in a host computer 1000, and first HV conversion and second HV conversion are performed in a printer 1001. The functions of the respective blocks in FIG. 12 are the same as those in FIG. 4.

In this manner, since the host computer 1000 transfers ID data corresponding to extracted representative colors to the printer 1001, image data can be transferred at high speed even when the printer 1001 performs a high-resolution print operation.

Note that the above-mentioned first HV conversion function may be executed by the host computer 1000. In this case, the capacity of the line memory required in the printer 1001 can be reduced, and the cost of the printer can be reduced.

Also, the present invention may also be applied to a case wherein the invention is attained by supplying a program to the system or apparatus.

More specifically, the processing performed by the host computer 1000 in FIG. 12 may be executed based on a program which is stored in a storage medium and is loaded to the host computer 1000.

Figure 13:
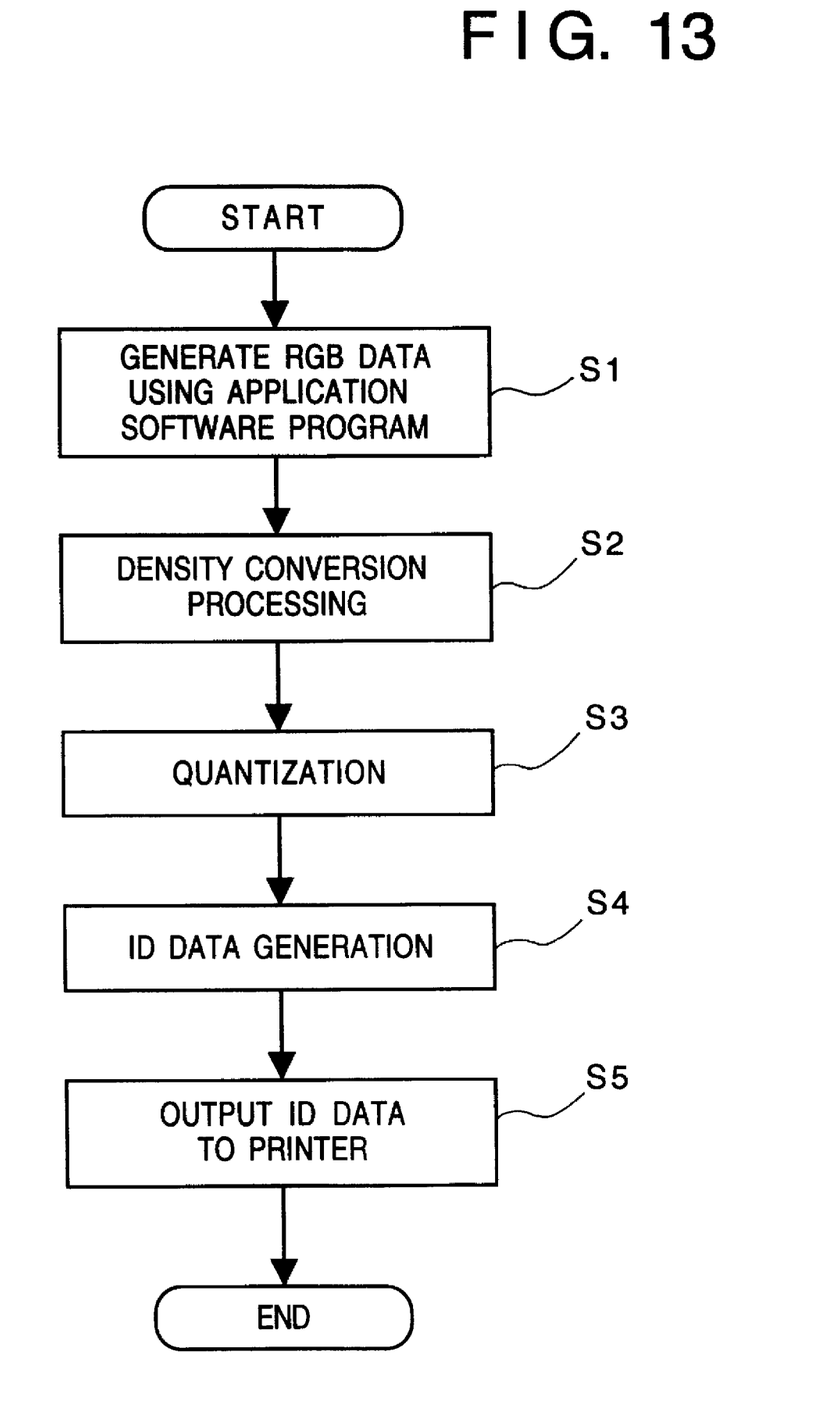
FIG. 13 is a flow chart for explaining the modification of the present invention.

FIG. 13 shows the processing sequence of the host computer 1000 on the basis of the program.

In the host computer 1000, R, G, and B data in units of pixels are generated using an image creation software program (S1). The R, G, and B data are subjected to density conversion processing (S2), quantization (S3), and ID data generation (S4) as in the above-mentioned embodiment, and the obtained ID data are supplied to the printer 1001 (S5).

With the above-mentioned software processing, special-purpose hardware components can be reduced by effectively using the functions of the host computer 1000.

As described above, according to the present invention, since HV conversion for re-arranging image data to be output in correspondence with the arrangement direction of recording elements in a recording head is performed based on ID data of a dot pattern in place of the dot pattern itself, the amount of data to be converted can be greatly reduced. Therefore, the required capacity of a line memory can be reduced, and a cost reduction of the printer can be attained. At the same time, a high processing speed can be expected.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments, and various changes and modifications may be made within the scope of the appended claims.

What is claimed is:

1. An image processing apparatus for re-arranging dots of image data constituted by dot patterns, and outputting the re-arranged image data, comprising:

ID conversion means for converting image data into ID data representing dot patterns;

first HV conversion means for replacing with each other horizontal and vertical directions of an arrangement order of a plurality of ID data obtained by converting a plurality of dot patterns by said ID conversion means;

pattern conversion means for converting the plurality of ID data whose arrangement order is re-arranged by said first HV conversion means into dot patterns; and second HV conversion means for replacing with each other horizontal and vertical directions of the dot patterns obtained by converting the ID data by said pattern conversion means.

2. The apparatus according to claim 1, wherein each of the dot patterns is a density pattern determined by a density value of one pixel.

3. The apparatus according to claim 1, further comprising recording means having a plurality of dot output means each for outputting one dot, and wherein the vertical direction is an arrangement direction of said plurality of dot output means in said recording means.

4. The apparatus according to claim 1, further comprising quantization means for quantizing density values in units of pixels of the image data, and wherein said ID conversion means converts the quantized density values into ID data indicating the dot pattern that expresses each pixel.

5. The apparatus according to claim 4, wherein said ID conversion means converts each pixel into ID data using a table.

6. The apparatus according to claim 1, further comprising holding means for temporarily holding the ID data when said first HV conversion means re-arranges the arrangement order of the plurality of ID data, and wherein said first HV conversion means stores the plurality of ID data for N lines (N is a natural number) arranged in a raster format in the horizontal direction, and said first HV conversion means re-arranges the arrangement order of the plurality of ID data by reading out the plurality of ID data stored in said holding means in units of N data in the vertical direction.

7. The apparatus according to claim 1, wherein said pattern conversion means converts the ID data into the dot pattern using a table.

8. The apparatus according to claim 1, wherein an information amount of the ID data is smaller than a total information amount obtained when the corresponding dot pattern is expressed in units of dots.

9. The apparatus according to claim 3, wherein said recording means is an ink-jet recording head for performing recording by ejecting an ink.

10. The apparatus according to claim 9, wherein said recording means is a recording head for ejecting the ink by utilizing heat energy, and comprises a heat energy conversion element for generating the heat energy to be applied to the ink.

11. An image processing method for re-arranging dots of image data constituted by dot patterns, and outputting the re-arranged image data, comprising the steps of:

converting image data into ID data representing dot patterns;

replacing with each other horizontal and vertical directions of an arrangement order of a plurality of ID data obtained by converting the image data;

converting the plurality of ID data whose arrangement order has been re-arranged into dot patterns; and replacing with each other horizontal and vertical directions of the dot patterns obtained by converting the ID data.

12. The method according to claim 11, wherein each of the dot patterns is a density pattern determined by a density value of one pixel.

13. The method according to claim 11, wherein the vertical direction is an arrangement direction of a plurality of dot output means in recording means which comprises the plurality of dot output means each for outputting one dot.

14. An image processing apparatus for re-arranging dots of image data constituted by dot patterns, and outputting the re-arranged image data, comprising:

ID conversion means for converting image data into ID data representing dot patterns; and output means for outputting the ID data to an image forming unit, wherein said image forming unit comprises first HV conversion means for replacing with each other horizontal and vertical directions of an arrangement order of a plurality of ID data obtained by converting a plurality of dot patterns by said ID conversion means, pattern conversion means for converting the plurality of ID data whose arrangement order is re-arranged by said first HV conversion means into dot patterns, second HV conversion means for replacing with each other horizontal and vertical directions of the dot patterns obtained by converting the ID data by said pattern conversion means, and image forming means for forming an image on a printing medium based on the dot patterns converted by said second HV conversion means.

* * * * *